(12) United States Patent
Tao et al.

(10) Patent No.: US 11,673,576 B2
(45) Date of Patent: Jun. 13, 2023

(54) NESTED SCENARIOS IN PLANNING FOR AUTONOMOUS DRIVING VEHICLES

(71) Applicant: Baidu USA LLC, Sunnyvale, CA (US)

(72) Inventors: Jiaming Tao, Sunnyvale, CA (US); Qi Luo, Sunnyvale, CA (US); Jinyun Zhou, Sunnyvale, CA (US); Kecheng Xu, Sunnyvale, CA (US); Yu Wang, Sunnyvale, CA (US); Shu Jiang, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 256 days.

(21) Appl. No.: 16/827,510

(22) Filed: Mar. 23, 2020

(65) Prior Publication Data

US 2021/0291863 A1    Sep. 23, 2021

(51) Int. Cl.
*B60W 60/00* (2020.01)
*G05D 1/02* (2020.01)
*G05D 1/00* (2006.01)
*B60W 40/04* (2006.01)

(52) U.S. Cl.
CPC ........ *B60W 60/0011* (2020.02); *B60W 40/04* (2013.01); *G05D 1/0088* (2013.01); *G05D 1/0212* (2013.01); *G05D 2201/0212* (2013.01); *G05D 2201/0213* (2013.01)

(58) Field of Classification Search
CPC ............. B60W 60/0011; B60W 40/04; G05D 1/0088; G05D 1/0212; G05D 2201/0212; G05D 2201/0213
USPC ......................................................... 701/26
See application file for complete search history.

(56) References Cited

U.S. PATENT DOCUMENTS

| | | | |
|---|---|---|---|
| 10,684,626 B1* | 6/2020 | Martin | G06K 9/6288 |
| 2017/0158193 A1* | 6/2017 | Lopez | B60W 30/0956 |
| 2020/0023842 A1* | 1/2020 | Gutierrez | G06V 40/10 |
| 2020/0250437 A1* | 8/2020 | Rahimpour | G06V 10/255 |
| 2020/0406906 A1* | 12/2020 | Omari | B60W 50/0098 |
| 2021/0080971 A1* | 3/2021 | Chen | G06F 16/9024 |
| 2021/0350146 A1* | 11/2021 | Zhang | G06V 20/56 |

* cited by examiner

*Primary Examiner* — Yazan A Soofi
(74) *Attorney, Agent, or Firm* — Womble Bond Dickinson (US) LLP

(57) ABSTRACT

In one embodiment, an ADV is routed by executing a first driving scenario that is active. The first driving scenario is one of a plurality of driving scenario types, each driving scenario type being associated with one or more stages to be executed while a corresponding driving scenario type is active. Based on an environmental condition around the ADV, a second driving scenario is set as active. The ADV is routed by executing the second driving scenario. When the second driving scenario exits, execution of the first driving scenario resumes at the one or more stages of the first driving scenario that remains to be executed.

20 Claims, 8 Drawing Sheets

NESTED SCENARIOS IN PLANNING FOR AUTONOMOUS DRIVING VEHICLES

TECHNICAL FIELD

Embodiments of the present disclosure relate generally to operating autonomous vehicles. More particularly, embodiments of the disclosure relate to nested scenarios used for planning for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Autonomous driving vehicles (ADV) can use algorithms to plan a route of the ADV. Control commands are generated to move the ADV along the route. Algorithms for route generation can vary from one vehicle scenario to another. For example, an algorithm that plans vehicle route for normal driving conditions can be different than an algorithm used for obstacle avoidance.

A scenario-based planning architecture might support flat scenario dispatching. In such an architecture, planning of the ADV route and speed allows only one scenario to be selected and processed. Another scenario can be made active only when the current active scenario exits or completes. Such an architecture and system presents limitations on the ability to handle complicated driving scenarios where two or more driving objectives may be present. For example, trying to avoid an obstacle while also driving through an intersection. Further, scenario scalability and code reuse would be difficult under such an architecture.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a system and method supports nested scenario based planning for an ADV. Complicated driving scenarios with multiple objectives are supported with improved reliability, scalability, and performance. Routing of an ADV can be performed through execution of a first driving scenario, which is active. The driving scenario can have a driving scenario 'type'—for example, a default or normal driving scenario, a stop sign scenario, a traffic light scenario, etc. Each driving scenario type defines one or more stages to be executed while a driving scenario with the corresponding type is active.

Based on an environmental condition around the ADV, a second driving scenario can be set as active, and the first driving scenario becomes 'paused'. For example, if the ADV is driving in a 'normal' scenario, then comes upon a stop sign. A second driving scenario having type 'stop sign' can become active.

When the second driving scenario exits (for example, due to completion or a change in the ADVs environment), the system can resume execution of the first driving scenario, which becomes active. The execution can resume at the one or more stages of the first driving scenario that remains to be executed.

It should be understood that 'routing' can include generating a route with defined speed along the route, and commanding the ADV along the generated route with a series of commands (e.g., throttle, steering, and/or braking).

Figure 1:
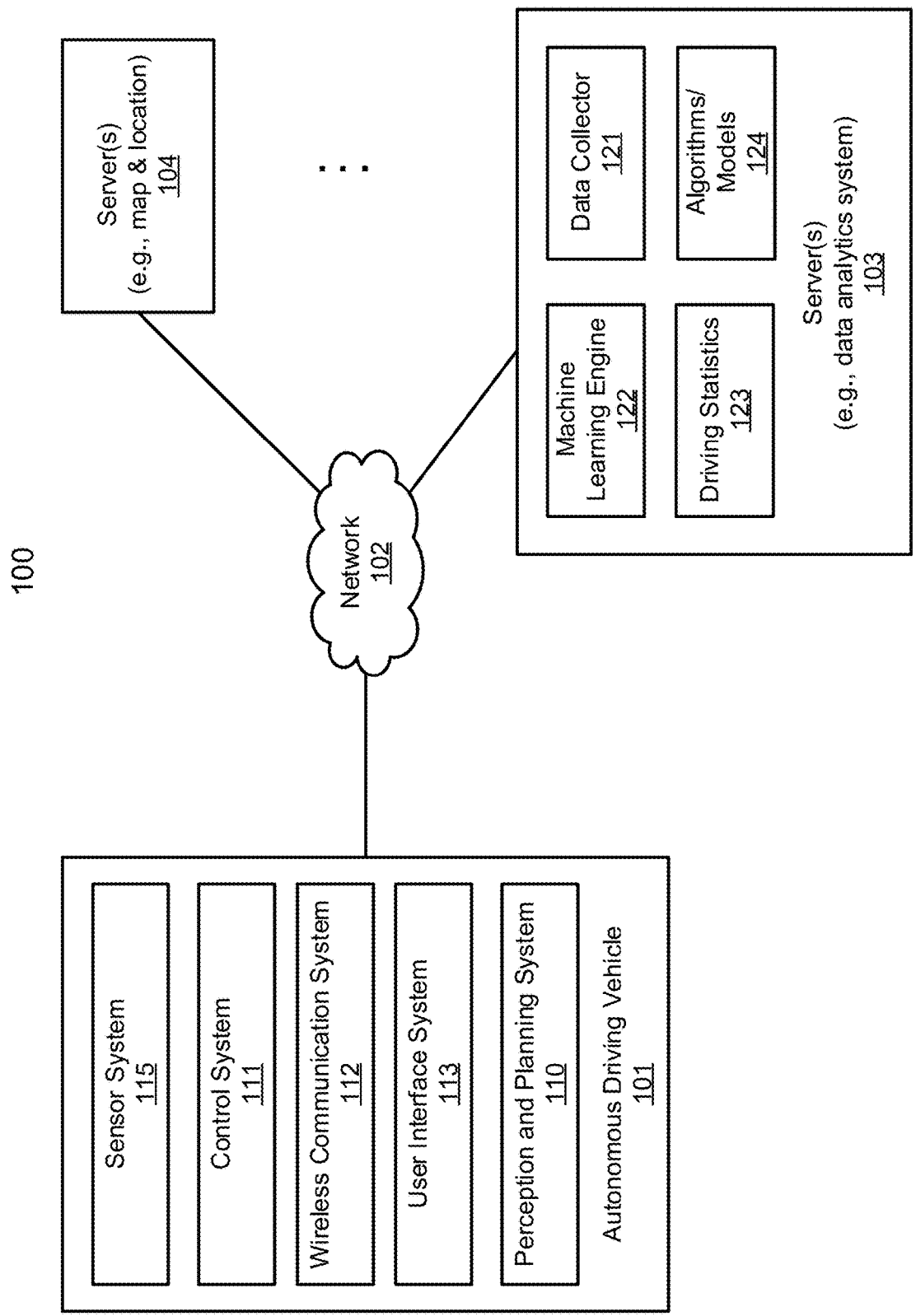
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
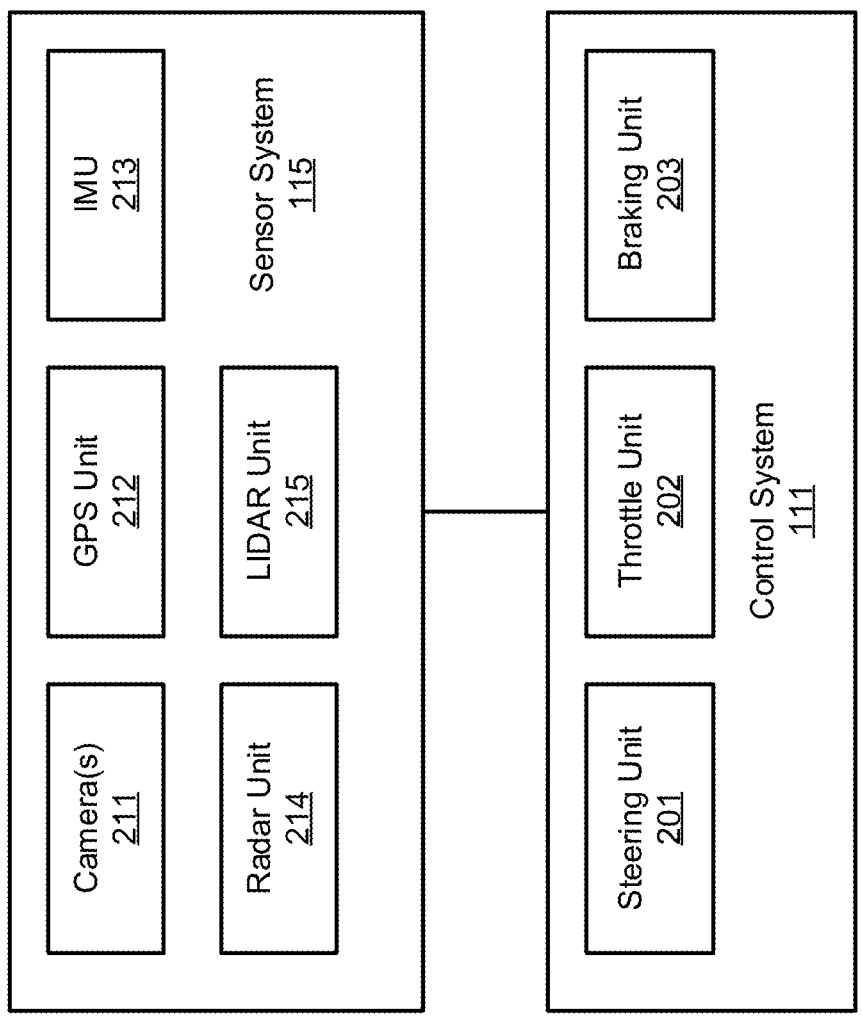
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics

123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include objective functions for each of the stages that are associated with the driving scenarios. Depending on the stage, these objective functions can be unique to each stage. These algorithms determine paths for the ADV, these paths being uniquely tailored to each stage. Such algorithms can define constraints, cost function terms, and weights, and these constraints, cost function terms, and weights can vary from one stage to another. Algorithms 124 can then be uploaded on ADVs to be utilized during autonomous driving in real-time.

Figure 3A:
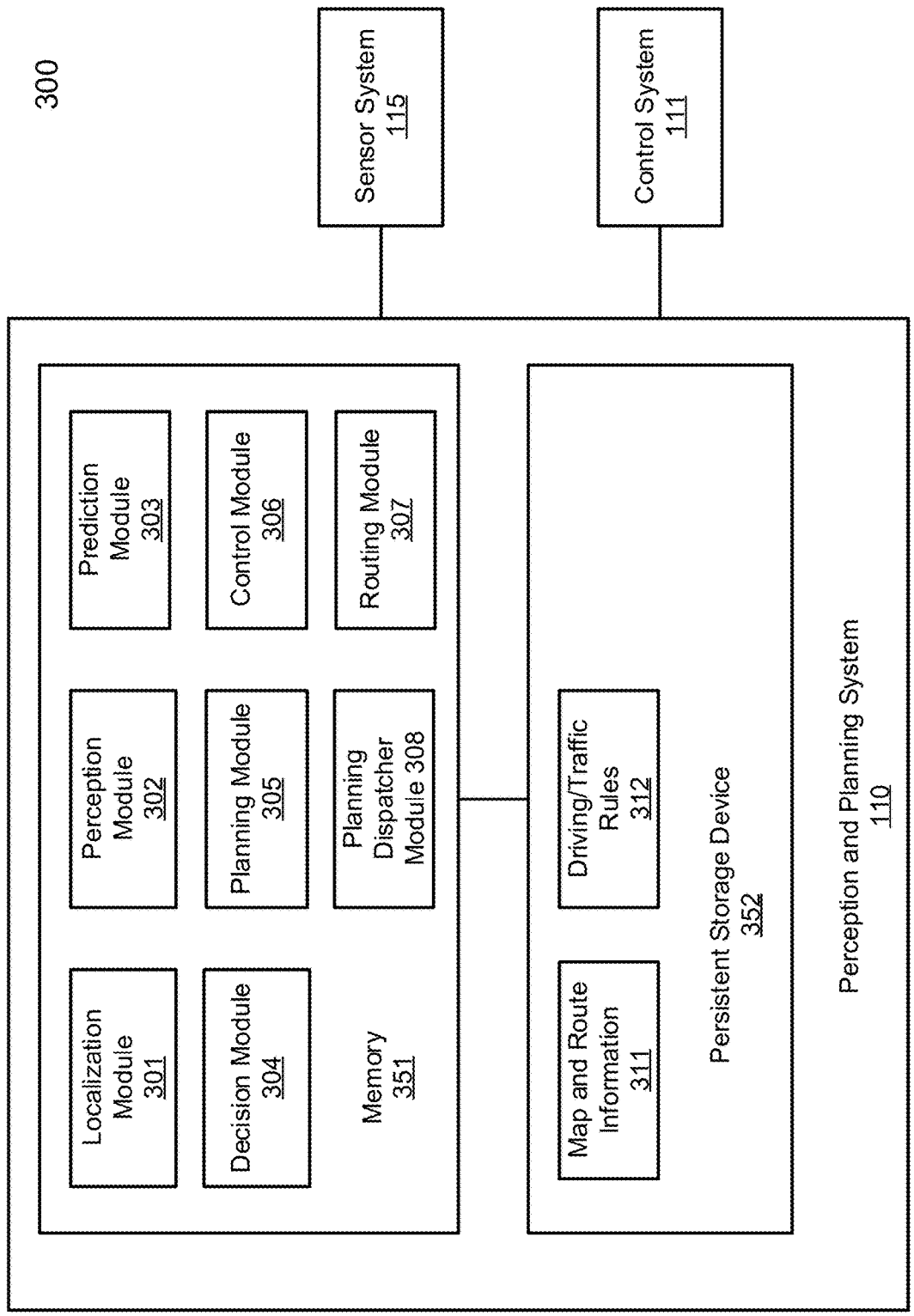
FIGS. 3A-3B are block diagrams illustrating an example of a perception and planning system used with an autonomous vehicle according to one embodiment.
Figure 3B:
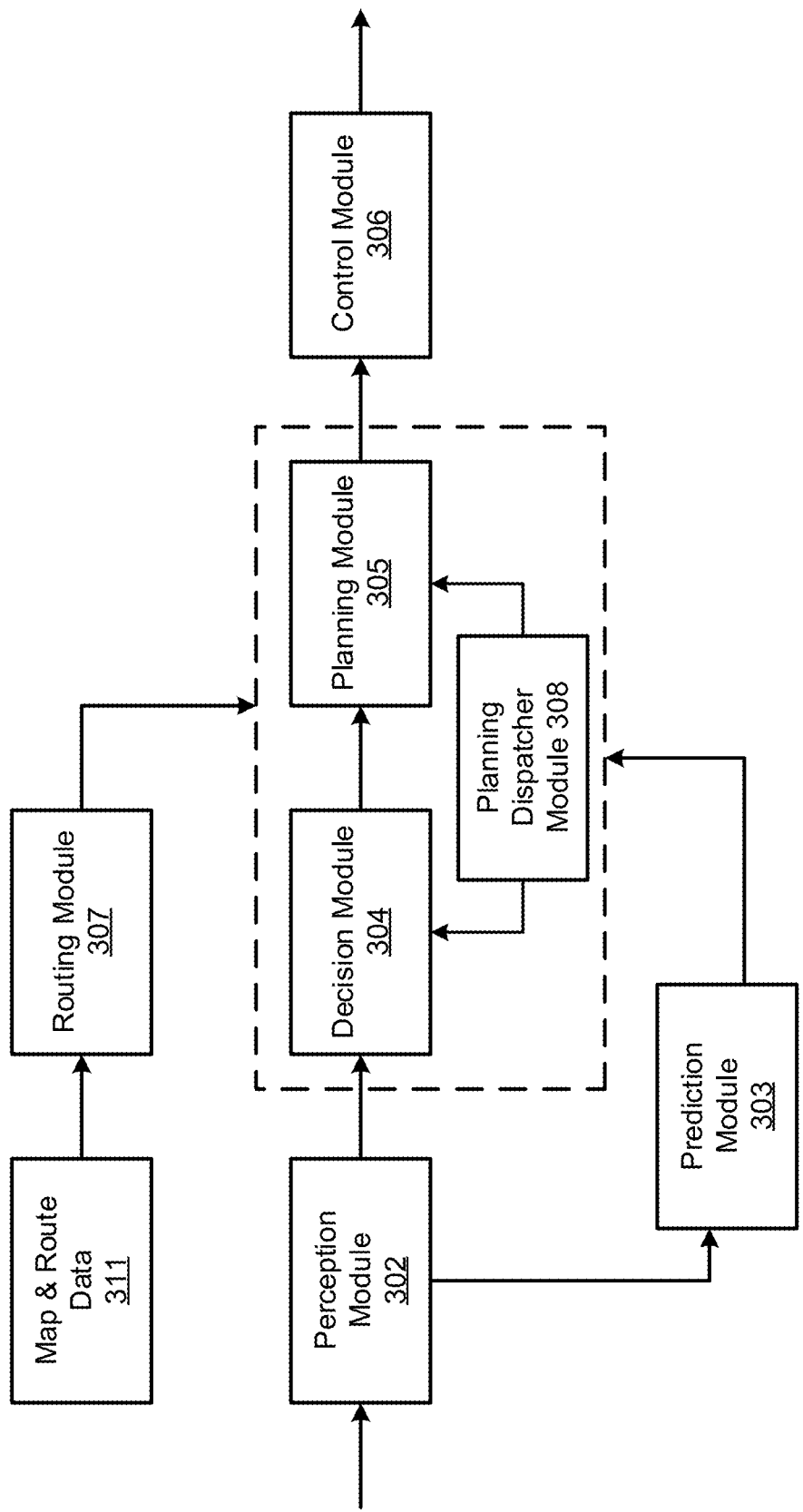

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and planning dispatcher module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Planning and dispatcher module 308 can determine a driving scenario that applies to a current environment and situation of the ADV. Based on the current active driving scenario and the stages associated with the driving scenario, the decision module 304 and the planning module 305 implement corresponding algorithms to tailor the decisions and the path to the active driving scenario and stage. This is further described in other sections.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Planning dispatcher module 308 manages scenario activity of the ADV. This includes management of nested scenarios, while the ADV is driving. With nested scenarios, when a 'parent' scenario is active and being processed, one or more 'stages' of the parent scenario can be executed one at a time, sequentially. An existing, well-tested scenario can be inserted in place of one of the parent's stages. This inserted scenario, a 'child' scenario, then becomes active. Stages that are associated with the child scenario are then processed. When the child scenario exits the parent can resume processing, for example, at the parent stage that was interrupted, or at the next stage of the parent. The terms 'processed' and 'executed' in the context of scenarios and stages refers to executing instructions and algorithms that are associated with the scenario and stage respectively, such as decision making and path generation/optimization tasks.

The child scenario can also have children scenarios. The depth of the nested structure can be defined and limited as appropriate. For example, the system can have a max depth of 5 or 10 scenarios.

The planning and dispatcher module can select which child scenario type should be active, based on an environmental condition of the ADV. For example, under normal driving conditions, when the ADV is traveling forward along a route from point A to point B, the planning dispatcher module can set the default or normal driving scenario as active. When the ADV approaches a stop sign, the planning dispatcher module can set a child scenario (having 'stop sign' type) as active. This can be done by inserting the child scenario as a stage of the parent scenario, thereby creating a 'nested' structure. This utilizes the execution path of the stages to introduce and make active the child scenario. This is further described in other sections.

Each of the plurality of driving scenario types can define a unique sequence of the one or more stages to be executed while the corresponding driving scenario type is active. Each stage, in turn, defines its own decision and optimization tasks to achieve an objective of that stage.

For example, the stop sign scenario can have a first stage that has an objective of approaching the stop sign, a second stage that has an objective to achieve a complete stop, a third stage that has an objective to creep past the stop sign while taking precautions that the path is clear, and a fourth stage that has an objective to drive along the ADV route at a desired speed. This is meant to be illustrative rather than limiting. The stages of the stop sign scenario, or the other scenario types, can be generally be defined by one skilled in the art and is not germane to the scope of this disclosure.

When this child scenario completes execution of all stages, then the nested architecture of the planning dispatcher module will automatically cause the parent scenario to become active and resume execution and control. In this manner, the planning dispatcher module can support nested scenarios to improve reliability, scalability, and performance. Scenario types can cover discrete driving situations rather than having to cover many different situations, because, with such a structure, the planning dispatcher module can dynamically implement scenario types to cover each situation individually, so that one scenario need not cover all situations. Note that module 308 may be integrated with any one or more of modules 301-307, such as, for example, planning module 305.

Figure 4:
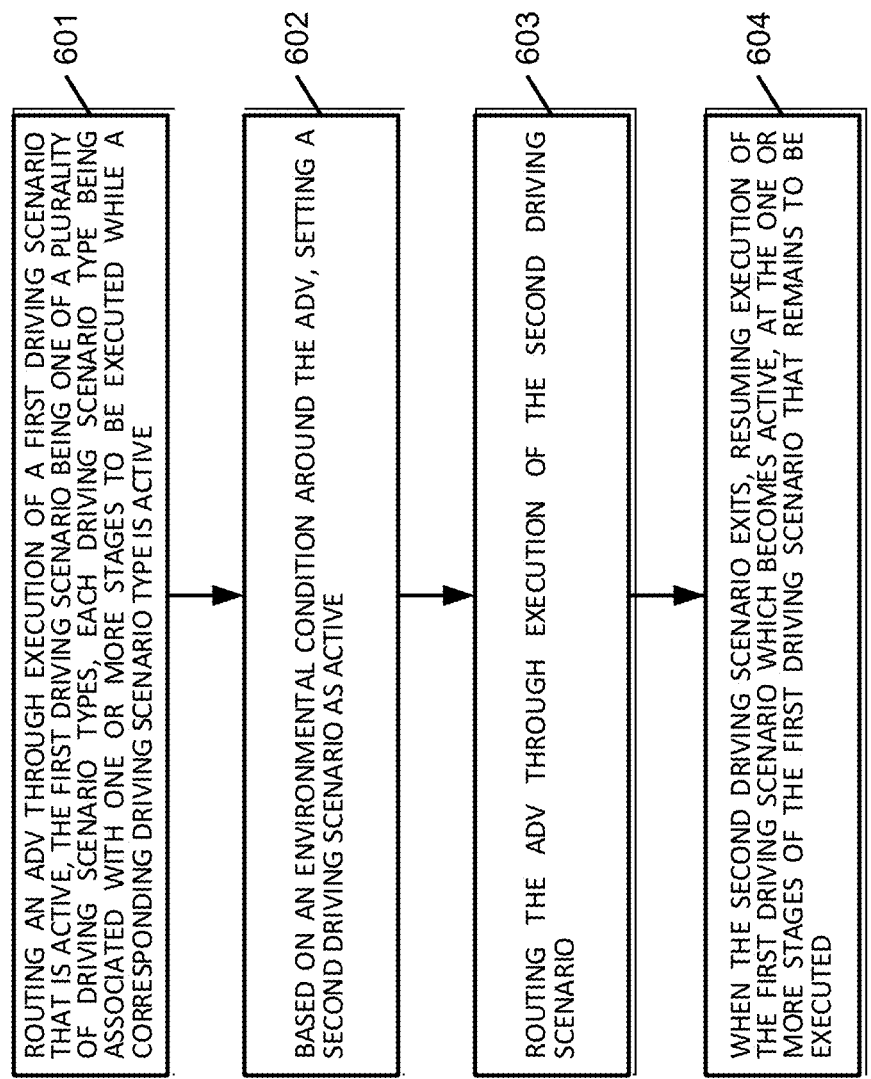
FIG. 4 shows a method for routing an ADV with nested scenarios, according to one embodiment.

In FIG. 4, a method 600 for planning and routing an ADV is shown according to one embodiment. Process 600 may be performed by processing logic which may include software, hardware, or a combination thereof. For example, such a method can be performed by the planning dispatcher module 308 described in the present disclosure.

Operation 601 includes routing an ADV through execution of a first driving scenario that is active, the first driving scenario being one of a plurality of driving scenario types, each driving scenario type being associated with one or more stages to be executed while a corresponding driving scenario type is active. 'Routing', in this context, can include a) making a decision as to whether to stop, yield, or overtake another object; b) determining a path and speed along the path for the ADV to follow; and/or c) controlling the ADV to move accordingly along the path through a series of control commands including throttle, steering, and/or braking.

Operation 602 includes setting a second driving scenario as active based on an environmental condition around the ADV. This child scenario is made active without exiting the parent scenario. The parent scenario can be 'paused'— state and other information are saved and used to resume the parent when the child scenario exits. An environmental condition around the ADV can indicate at least one of: normal, a stop sign, an intersection, a traffic light, a pedestrian, and a road vehicle. Such an environmental condition can be determined by the ADV based on at least one of: ADV localization data, map data, traffic rules, and sensed obstacles (e.g., other vehicles, pedestrians, a structure, or debris). For example, the position and heading of the ADV can be referenced against map data to determine the vehicle is approaching a stop sign. In response, the ADV can set the second driving scenario (e.g., a 'stop sign' scenario) as active.

Setting the second driving scenario as active can include inserting the second driving scenario as one of the one or more stages associated with the parent that is to be executed while the parent is active. For example, the method can execute the stages of the parent in an execution queue, in sequential order. In some embodiments, a pointer or reference to the child scenario can be inserted in place of a stage associated with the parent, to set the child scenario as active. When the environmental condition of the ADV requires a change (e.g., a pedestrian is sensed to be in the road), then a 'pedestrian interaction' scenario can be inserted into the queue. The current stage status can be saved and exited, and execution of the 'pedestrian interaction' can be performed, thereby setting the pedestrian interaction scenario as the active scenario.

Operation 603 includes routing the ADV through execution of the second driving scenario. Execution of a driving scenario refers to route generation for the ADV based on execution of the sequence of stages defined by the driving scenario type. As discussed, each stage, when executed, imposes its own algorithms (including, for example, constraints, cost functions define by cost terms and weights, and methods to minimize those cost functions) to generate the route for the ADV. For example, a 'side pass' scenario can include a first stage that generates a path to a side of another vehicle, and a second stage that includes increasing speed to move pass the vehicle. Algorithms will differ for those stages because the objectives in both stages are different.

Operation 604 includes when the second driving scenario exits, resuming execution of the first driving scenario which becomes active, at the one or more stages of the first driving scenario that remains to be executed. This method can be performed while the ADV is driving, to dynamically modify how the ADV is routed, according to the ADV's environment. Such a method is further discussed relative to the examples shown in FIGS. 7-9.

Figure 5:
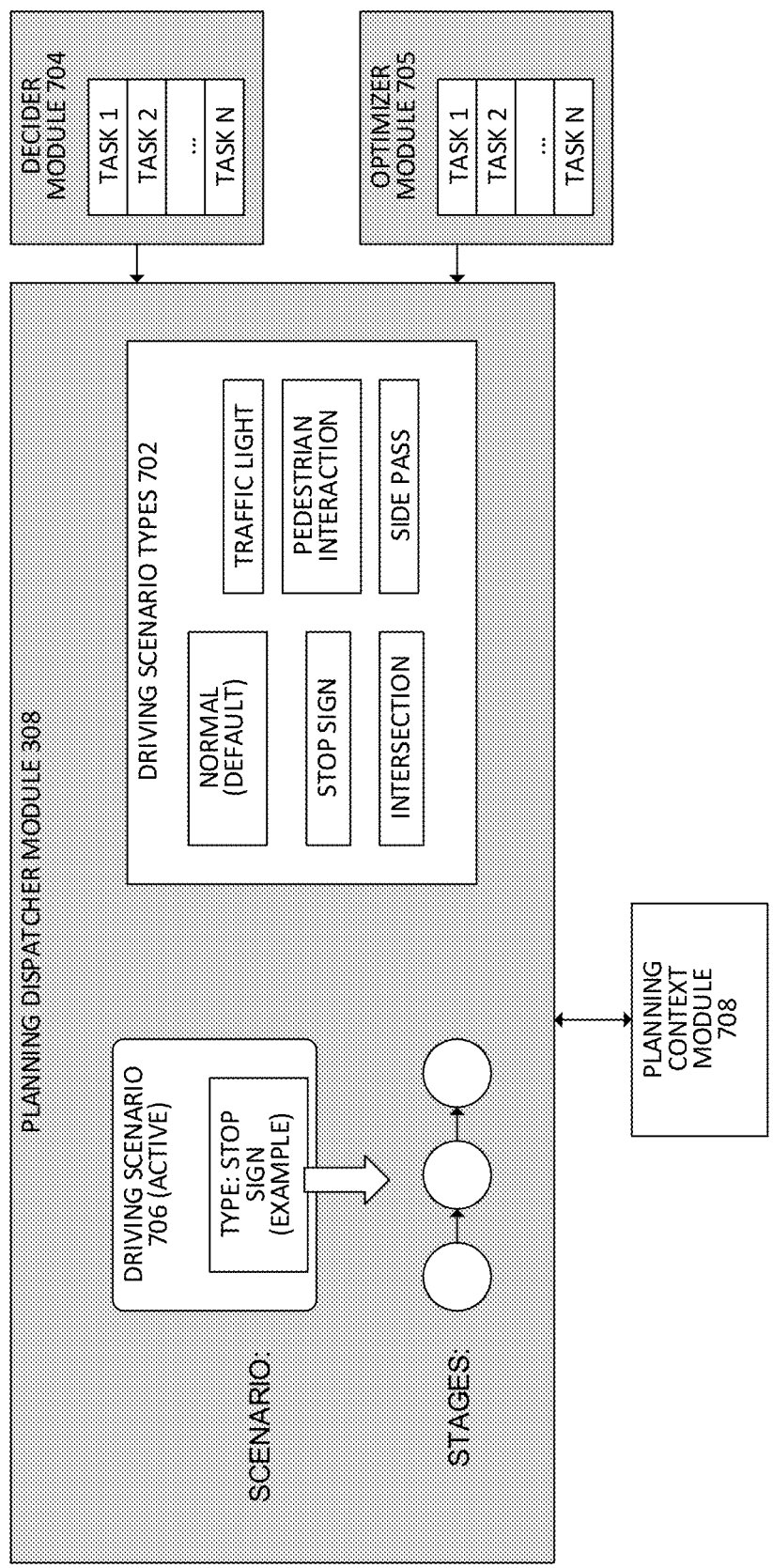
FIGS. 5-7 show a system with nested scenario planning for an ADV, according to some embodiments.

Referring to FIG. 5, a planning dispatcher module 308 is shown according to one embodiment. In this example, a first driving scenario 706 is currently active. The driving scenario can be any one of a plurality of driving scenario types 702. These driving scenario types can be pre-defined and stored as data and/or instructions in computer readable memory. The driving scenario types can include at least two of: a default scenario, a stop sign scenario, an intersection scenario, a traffic light scenario, a pedestrian interaction scenario, and a side pass scenario.

Each of the plurality of driving scenario types defines a unique sequence of one or more stages to be executed while the corresponding driving scenario type is active. These stages can be executed sequentially and/or in a specified order to complete a scenario. The methods and systems described in the current disclosure encourage additional driving scenarios and supports integration of such scenarios due to the flexibility of the nested scenario architecture. Thus, these scenarios are meant to be illustrative rather than limiting. The driving scenario types can include additional scenario types without departing from the scope of the present disclosure.

A default scenario can be a normal scenario that is made active when a) the ADV drives from one location to another, and b) environmental conditions do not require another scenario to be made active. The algorithms associated with the default scenario can route the ADV to a destination while optimizing for speed, comfort, and efficiency, as described in other sections.

A stop sign scenario can be made active when the ADV approaches a stop sign, for example, when the ADV is 5, 10, 20, or 30 meters away from the stop sign. The algorithms associated with the stop sign scenario can route the ADV so that it comes to a complete stop, then safely drives forward.

Similarly, a traffic light scenario can be made active when the ADV approaches a traffic light, e.g., at 5, 10, 20, or 30 meters away from the intersection. The algorithms associated with the traffic light scenario can route the ADV according to traffic light color, and other traffic rules.

A pedestrian interaction scenario can be made active when the ADV detects a pedestrian within a threshold distance of the ADV or the ADV path, e.g., from 0 to 50 meters. The algorithms associated with the pedestrian scenario can route the ADV to come to a stop and wait for the pedestrian to move, and/or to drive very slowly past the pedestrian at a safe distance away from the pedestrian.

A side pass scenario can be made active when the ADV detects another vehicle driving in front of the ADV in the same lane, at a threshold distance from the ADV (e.g., 5, 10, 20, or 30 meters. The algorithms associated with the side pass scenario can route the ADV to the side of, and then past the detected vehicle.

As described, the algorithms for each scenario can be defined by each of the stages associated with a respective driving scenario type. In some embodiments, each of the one or more stages uniquely identifies one or more algorithms that are implemented to tailor generation of a vehicle path and vehicle speed along the path to the corresponding driving scenario type. These algorithms are implemented by tasks of the decider module 704 and optimizer module 705.

The decider module 704 can include a plurality of tasks that decide how the ADV vehicle will react in the given situation (e.g., stop, yield, overtake, etc.) In the case of a stop sign scenario, for example, the tasks would slow down in the approach stage, then stop in the stop stage.

The optimizer module 705 optimizes the vehicle path and speed along the path with optimization tasks, as described in other sections. The optimization algorithms can be unique to each stage as well, for example, when approaching a stop sign, the optimization algorithm may want to penalize jerking, however, in a pedestrian interaction scenario, comfort can have a low priority, while avoiding the pedestrian is added as a hard constraint or with a higher priority (e.g., by reducing the weight associated with steering and/or braking in a cost function).

In some embodiments, the tasks of decider module 704 are performed by decision module 304 as shown in and described relative to FIG. 3B. In some embodiments, the tasks of optimizer module 705 are performed by planning module 305 as shown in and described relative to FIG. 3B. Thus, the decision module decides what to do with an object, a traffic light, or traffic sign (e.g., a stop sign). The planning module generates the path, including determining speed along the path.

When a child scenario is made active, information associated with the parent scenario can be saved in planning context module 308. This information of the parent scenario is preserved through the duration of the child scenario, and any additional child scenarios, so that the parent scenario can resume where it left off. Planning context module 708 can include computer readable memory that is globally accessible, for storing the information.

Figure 6:
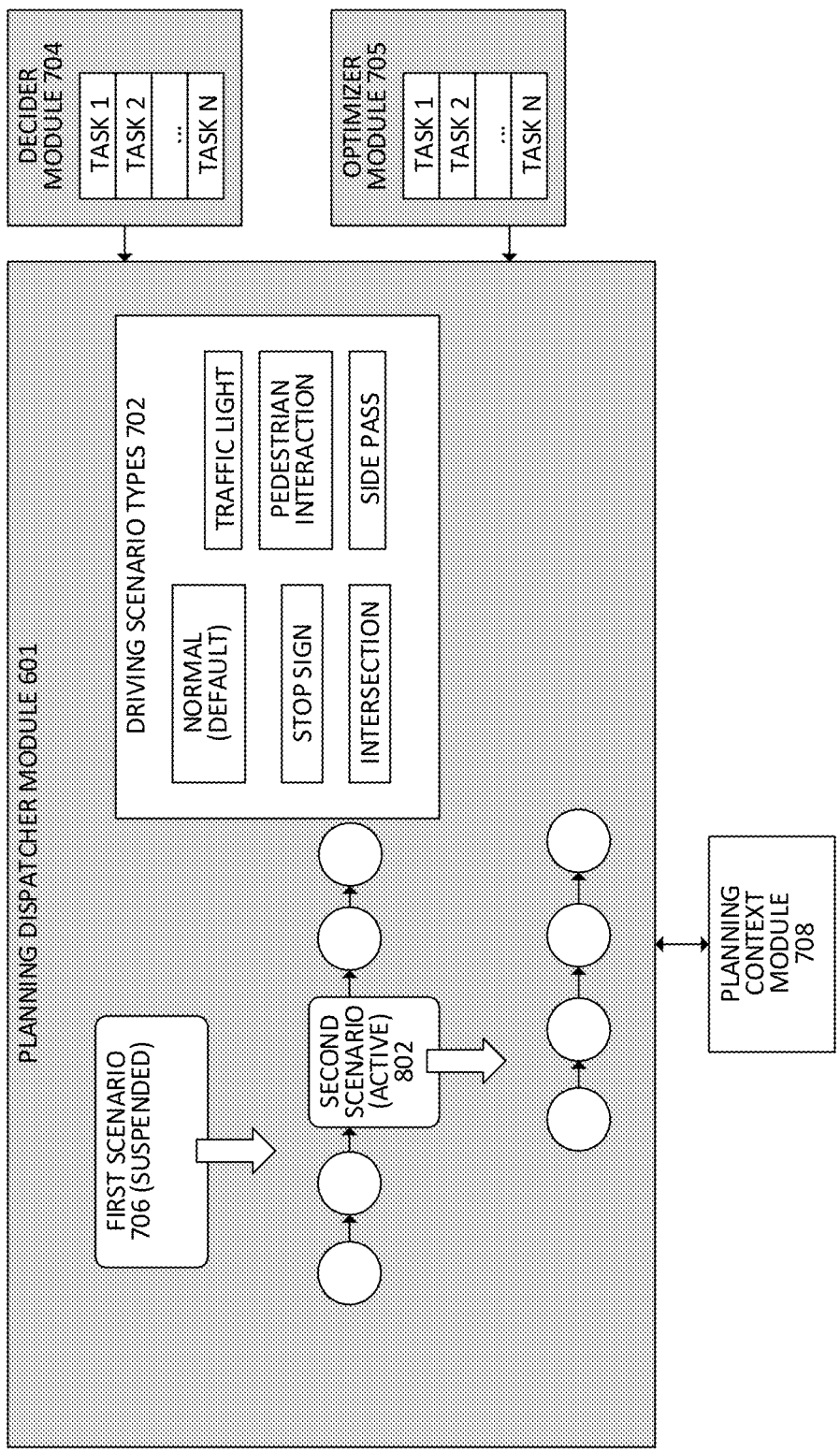

Referring to FIG. 6, an environmental condition around the ADV can prompt the planning dispatcher module 601 to set a second driving scenario 802 as active. For example, the first scenario can be a normal driving scenario, but as the ADV approaches the stop sign, the planning dispatcher module can make the second driving scenario, a stop sign scenario, active. The first driving scenario becomes suspended, and the second scenario is inserted into the execution path of the planning dispatcher module. Information relevant to the first driving scenario, such as what stage the first driving scenario is in, where obstacles are, what the decider and optimizer parameters are, time stamps, and/or more, are stored in planning context module so that the first scenario can be resumed when the second scenario exits.

The ADV can be routed through execution of the second driving scenario. In this example, the ADV safely approaches, stops, then proceeds. The first driving scenario can then reference planning context module to resume at the stage that was interrupted (e.g., at stage A2). It should be understood that the first scenario and the second scenario can be any of the scenario types 702, in addition to other scenario types not shown, without departing from the scope of the disclosure.

Figure 7:
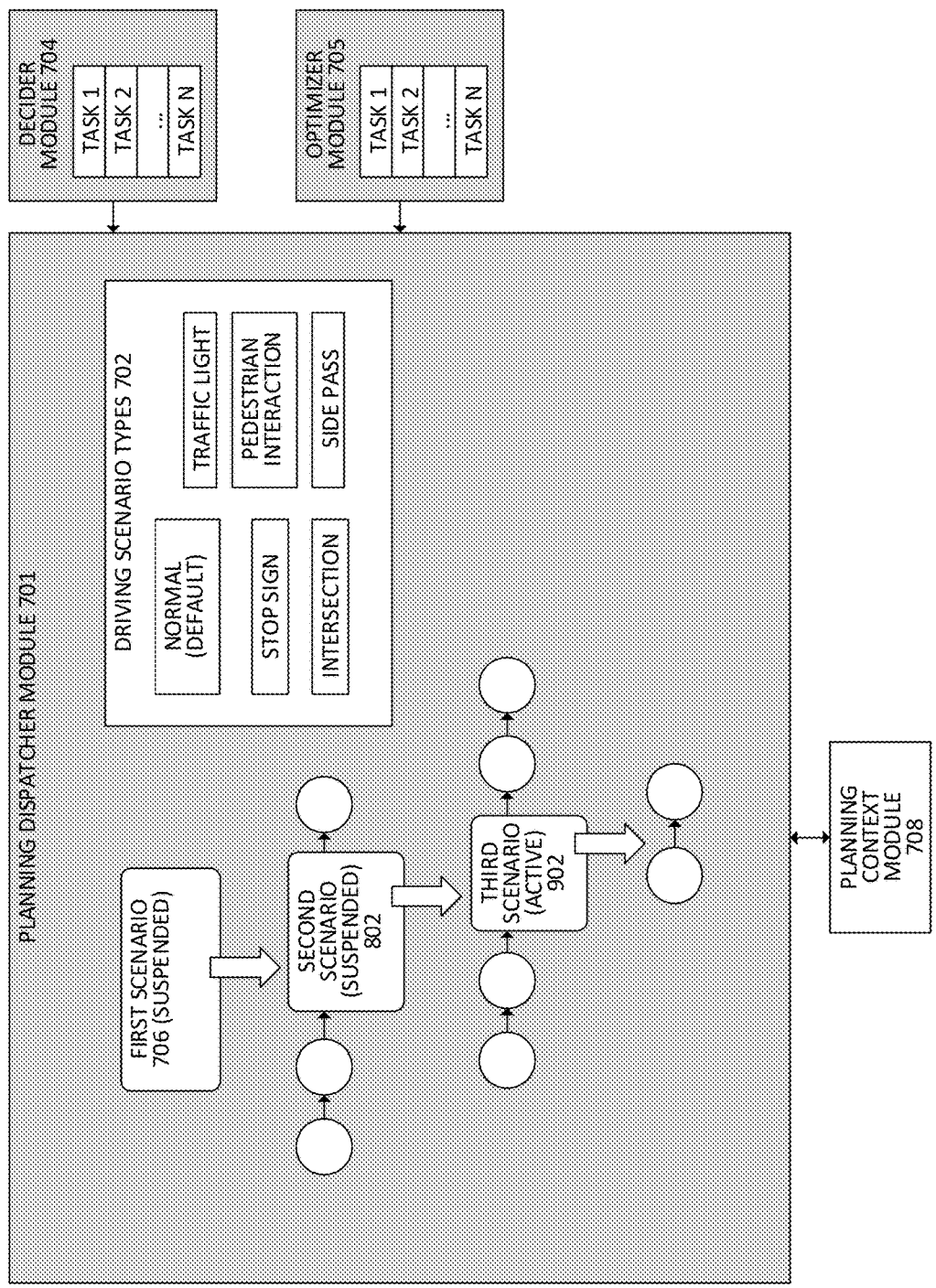

As shown in FIG. 7, the planning dispatcher module 701 can perform additional nesting of scenarios. For example, based on another environmental condition around the ADV, a third driving scenario 902 can be set as active. This driving scenario is a grandchild (child of the child) of first scenario 706. Using the same example, while in the stop sign scenario, a pedestrian can be detected within a proximity of the ADV path. The planning dispatcher can set the third driving scenario as active, in the same manner as how the second scenario was made active. The second scenario also becomes suspended. The ADV is routed through execution of the third driving scenario (e.g., stages C1 and C2) to safely avoid the pedestrian. Once this scenario completes or exits, the dispatcher can resume execution of the second scenario (e.g., stop sign). The stop sign scenario becomes active, and is also executed at a stage where this scenario was interrupted. When the stop sign scenario completes or exits, then the normal/default driving scenario can resume.

A scenario can exit when all stages are executed. A scenario can also be forced to exit prior to execution of all stages based on the environmental conditions of the ADV. For example, if another vehicle is going to be side passed, but then the vehicle pulls over or speeds up, then the planning dispatcher module can exit the scenario because the objective of the scenario is no longer required.

FIGS. 5-7 show examples of one, two, and three layers of scenarios capable of being managed by the same planning dispatcher module, however, additional nesting can be performed as well. The planning dispatcher module can limit how many layers are allowable. This can be a predefined limit or a dynamic limit. Such limits can vary based on application and can be determined through routine test and experimentation.

In some embodiments, the scenarios and/or the one or more stages can be configured through a database or configuration file. The configuration information can be stored in computer readable memory that is capable of being retrieved during run-time or for compilation of software. Thus, new scenarios and/or stages can be defined without new software code being written, allowing for improved usability of software. In some embodiments, each scenario is implemented as a state-machine where each stage is a 'state'. Thus, the planning context module stores the state of the scenario when the scenario is suspended, and retrieves this information when the scenario resumes.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for controlling an autonomous driving vehicle (ADV), comprising:
    routing an ADV through execution of a first driving scenario that is active, the first driving scenario being one of a plurality of driving scenario types, each driving scenario type being associated with one or more stages to be executed while a corresponding driving scenario type is active;
    based on an environmental condition around the ADV, entering a second driving scenario from the first driving scenario by setting the second driving scenario as active including inserting the second driving scenario as one of the one or more stages that are associated with the first driving scenario to be executed while the first driving scenario is active, resulting in a nesting of the second driving scenario within the first driving scenario such that when the second driving scenario exits, the first driving scenario automatically becomes active, while preserving planning and control data associated with the first driving scenario;
    routing the ADV through execution of the second driving scenario; and
    in response to exiting the second driving scenario, resuming execution of the first driving scenario which becomes active, at the one or more stages of the first driving scenario that remains to be executed based in part on the preserved planning and control data of the first driving scenario.

2. The method of claim 1, wherein the plurality of driving scenario types includes at least two of: a default scenario, a stop sign scenario, an intersection scenario, a traffic light scenario, a pedestrian interaction scenario, or a side pass scenario.

3. The method of claim 1, wherein the environmental condition around the ADV indicates at least one of: normal, a stop sign, an intersection, a traffic light, a pedestrian, or a road vehicle.

4. The method of claim 1, further comprising
    based on another environmental condition around the ADV, entering a third driving scenario by setting the third driving scenario as active, while suspending the second driving scenario;
    routing the ADV through execution of the third driving scenario; and
    when the third driving scenario exits, resuming execution of the second driving scenario which becomes active, at one or more stages of the second driving scenario that is remaining to be executed.

5. The method of claim 1, wherein each of the one or more stages uniquely identifies one or more algorithms that are implemented to tailor generation of a vehicle path and a vehicle speed to the corresponding driving scenario type.

6. The method of claim 1, wherein each of the plurality of driving scenario types defines a unique sequence of the one or more stages to be executed while the corresponding driving scenario type is active.

7. The method of claim 1, wherein upon completion of the second driving scenario, the first driving scenario resumes execution of the one or more stages associated with the first driving scenario based on where the second driving scenario was inserted.

8. The method of claim 1, wherein information associated with the first driving scenario is preserved through duration of the second driving scenario.

9. The method of claim 8, wherein the information is stored in computer readable memory that is globally accessible.

10. The method of claim 1, wherein configuration information for the one or more stages is stored in computer readable memory, capable of being retrieved during runtime.

11. A non-transitory machine-readable medium having instructions stored therein, which when executed by a processor, cause the processor to perform operations, the operations comprising:
    routing an ADV through execution of a first driving scenario that is active, the first driving scenario being one of a plurality of driving scenario types, each driving scenario type being associated with one or more stages to be executed while a corresponding driving scenario type is active;
    based on an environmental condition around the ADV, entering a second driving scenario from the first driving scenario by setting the second driving scenario as active including inserting the second driving scenario as one of the one or more stages that are associated with the first driving scenario to be executed while the first driving scenario is active, resulting in a nesting of the second driving scenario within the first driving scenario such that when the second driving scenario exits, the first driving scenario automatically becomes active, while preserving planning and control data associated with the first driving scenario;

routing the ADV through execution of the second driving scenario; and in response to exiting the second driving scenario, resuming execution of the first driving scenario which becomes active, at the one or more stages of the first driving scenario that remains to be executed based in part on the preserved planning and control data of the first driving scenario.

12. The non-transitory machine-readable medium of claim 11, wherein the plurality of driving scenario types includes at least two of: a default scenario, a stop sign scenario, an intersection scenario, a traffic light scenario, a pedestrian interaction scenario, or a side pass scenario.

13. The non-transitory machine-readable medium of claim 11, wherein the environmental condition around the ADV indicates at least one of: normal, a stop sign, an intersection, a traffic light, a pedestrian, or a road vehicle.

14. The non-transitory machine-readable medium of claim 11, wherein the operations further comprise:

based on another environmental condition around the ADV, entering a third driving scenario by setting the third driving scenario as active, while suspending the second driving scenario;

routing the ADV through execution of the third driving scenario; and when the third driving scenario exits, resuming execution of the second driving scenario which becomes active, at one or more stages of the second driving scenario that is remaining to be executed.

15. The non-transitory machine-readable medium of claim 11, wherein each of the one or more stages uniquely identifies one or more algorithms that are implemented to tailor generation of a vehicle path and a vehicle speed to the corresponding driving scenario type.

16. A data processing system, comprising:

a processor; and a memory coupled to the processor to store instructions, which when executed by the processor, cause the processor to perform operations, the operations including routing an ADV through execution of a first driving scenario that is active, the first driving scenario being one of a plurality of driving scenario types, each driving scenario type being associated with one or more stages to be executed while a corresponding driving scenario type is active;

based on an environmental condition around the ADV, entering a second driving scenario from the first driving scenario by setting the second driving scenario as active including inserting the second driving scenario as one of the one or more stages that are associated with the first driving scenario to be executed while the first driving scenario is active, resulting in a nesting of the second driving scenario within the first driving scenario such that when the second driving scenario exits, the first driving scenario automatically becomes active, while preserving planning and control data associated with the first driving scenario;

routing the ADV through execution of the second driving scenario; and in response to exiting the second driving scenario, resuming execution of the first driving scenario which becomes active, at the one or more stages of the first driving scenario that remains to be executed based in part on the preserved planning and control data of the first driving scenario.

17. The data processing system of claim 16, wherein the plurality of driving scenario types includes at least two of: a default scenario, a stop sign scenario, an intersection scenario, a traffic light scenario, a pedestrian interaction scenario, or a side pass scenario.

18. The data processing system of claim 16, wherein the environmental condition around the ADV indicates at least one of: normal, a stop sign, an intersection, a traffic light, a pedestrian, or a road vehicle.

19. The data processing system of claim 16, wherein the operations further comprise based on another environmental condition around the ADV, entering a third driving scenario by setting the third driving scenario as active, while suspending the second driving scenario;

routing the ADV through execution of the third driving scenario; and when the third driving scenario exits, resuming execution of the second driving scenario which becomes active, at one or more stages of the second driving scenario that is remaining to be executed.

20. The data processing system of claim 16, wherein each of the one or more stages uniquely identifies one or more algorithms that are implemented to tailor generation of a vehicle path and a vehicle speed to the corresponding driving scenario type.

* * * * *